United States Patent [19]

Neukam et al.

[11] 4,059,556

[45] Nov. 22, 1977

[54] SPINNABLE SOLUTIONS CONTAINING CROSSLINKABLE COPOLYMERS OF ACRYLONITRILE AND N-METHYLOL ALKYL ETHER ACRYLAMIDES

[75] Inventors: Theo Neukam; Ulrich Reinehr, both of Dormagen; Francis Bentz, Cologne; Günther Nischk, Dormagen, all of Germany

[73] Assignee: Bayer Aktiengesellschaft, Leverkusen, Germany

[21] Appl. No.: 760,705

[22] Filed: Jan. 19, 1977

[30] Foreign Application Priority Data

Jan. 22, 1976 Germany .............................. 2602350

[51] Int. Cl.² ............................ C08F 2/00; C08F 4/00; C08F 220/70
[52] U.S. Cl. ............................ 260/30.2; 260/30.8 DS; 260/32.6 R; 260/32.6 NA; 526/204; 526/208; 526/220; 526/222; 526/304

[58] Field of Search ............... 526/204, 220, 208, 304; 260/32.6 N, 30.2, 30.8 DS, 32.6 NA

[56] References Cited

U.S. PATENT DOCUMENTS

| | | | |
|---|---|---|---|
| 3,453,249 | 7/1969 | Szita et al. ............................ | 526/204 |
| 3,483,172 | 12/1969 | Shibukawa et al. ................. | 526/304 |
| 3,597,496 | 8/1971 | Dagon et al. ........................ | 526/208 |
| 3,723,378 | 3/1973 | Yoshida et al. .............. | 260/30.8 DS |
| 3,803,073 | 4/1974 | Goltsin et al. ....................... | 526/304 |
| 3,917,776 | 11/1975 | Sato et al. ............................ | 526/304 |
| 3,925,293 | 12/1975 | Knechtges et al. ............... | 526/30 X |

Primary Examiner—Herbert J. Lilling
Attorney, Agent, or Firm—Plumley and Tyner

[57] ABSTRACT

The invention relates to a process for the production of crosslinkable polymers of acrylonitrile by polymerising acrylonitrile with a crosslinking component and optionally other comonomers in strongly polar organic solvents and in the presence of a peroxodisulphate and a 1,3-diketone as initiator system.

1 Claim, No Drawings

SPINNABLE SOLUTIONS CONTAINING CROSSLINKABLE COPOLYMERS OF ACRYLONITRILE AND N-METHYLOL ALKYL ETHER ACRYLAMIDES

This invention relates to a process for the production of crosslinkable polymers of acrylonitrile by polymerising acrylonitrile with a crosslinking component and, optionally, other comonomers in strongly polar organic solvents and in the presence of an initiator system. Acrylic or methacrylic acid amides substituted by methylol alkyl ether groups are used as the crosslinking component.

It is already known (E. Muller et al, Makromol. Chem. 57, 27 (1962)) that methylol alkyl ether of acid amides crosslink readily in the presence of acids or acid donors.

It is also known that autocrosslinkable polymers can be stabilised by the addition of an α-aminocarboxylic acid during or after polymerisation (German Offenlegungsschrift No. 19 11360). Storable emulsions of homopolymers or copolymers of olefinically unsaturated amides containing methylol groups are obtained by this process.

In the process described in French Patent Specification No. 1,500,101, crosslinking during polymerisation is prevented by the addition of mineral salts. Crosslinking during drying is also prevented by the addition of mineral salts.

Stabilisations such as these are necessary because undesirable crosslinking can occur very quickly even during the polymerisation of acrylonitrile and N-methylol alkyl ethe of (meth)acrylic acid amides, especially if the polymerisation reaction is carried out in an acidic medium, as is generally desirable. Unfortunately, the use of conventional stabilisers involves certain disadvantages, for example the fact that the polymer obtained on completion of polymerisation has to be treated with a very large quantity of washing agent in order to remove at least most of the salt added.

It has now been found that, by polymerising acrylonitrile and N-methylol alkyl ethers of acrylamides or methacrylamides and, optionally, other comonomers in strongly polar organic solvents, there is no need to add stabilisers to prevent crosslinking during the polymerisation reaction. In cases where the polymerisation reaction is carried out in such solvents, there is surprisingly no evidence of crosslinking under the necessary working conditions, i.e. in an acidic medium.

Accordingly, it is an object of the present invention to provide a process for the production of spinnable solutions of crosslinkable copolymers of acrylonitrile. This and further objects, which will be evident from the following description and the Examples will be accomplished by a process for the production of spinnable solutions of crosslinkable copolymers of acrylonitrile which comprises solution polymerisation of at least 48% by weight of acrylonitrile, 0.5 to 12% by weight of a copolymerisable acid amide-N-methylol alkyl ether and, optionally, other copolymerisable monomers in a strongly polar organic solvent and in the presence of a peroxodisulphate and a 1,3-diketone as catalyst system.

According to the invention, the preferred crosslinking component is an N-methylol alkyl ether corresponding to the general formula

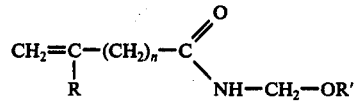

in which
R represents hydrogen or a methyl group,
n = 0 or an integer from 1 to 5 and
R' represents a linear or branched-chain alkyl radical with 1 to 10 carbon atoms, preferably with 1 to 4 carbon atoms.

Of these N-methylol alkyl ethers, the following are particularly suitable: (meth)acrylamide-N-methylol methyl ether, (meth)acrylamide-N-methylol ethyl ether, (meth)acrylamide-N-methylol propyl ether, (meth)acrylamide-N-methylol isopropyl ether, (meth)acrylamide-N-methylol-n-butyl ether, N-methoxy methyl acrylamide is particularly preferred.

Compounds of this kind may readily be obtained by the methods described in the literature (E. Muller, K. Dinges, W. Graulich, Makromol. Chem. 57, 27 (1962). The crosslinking component is preferably incorporated in the polymer in a quantity of from 0.5 to 7% by weight.

Particularly suitable optional comonomers are the monomers conventionally used in acrylonitrile fibre technology. Preferred monomers of this kind are acrylic acid and methacrylic acid alkyl esters, for example, (meth)acrylic acid methyl ester and (meth)acrylic acid ethyl ester. Monomers such as these may optionally be incorporated in the polymer in quantities of up to 40% by weight, although they are preferably incorporated in quantities of from 4 to 11% by weight. Standard dye-receptive additives, for example unsaturated sulphonic acid, preferably methallyl sulphonic acid, vinyl sulphonic acid or styrene sulphonic acid and their alkali salts, may also be incorporated in the polymer in quantities of up to approximately 3% by weight. In cases where halogen-containing monomers are incorporated in the polymer to improve flame resistance, these monomers are best used in quantities of up to 40% by weight and preferably in quantities of from 15 to 40% by weight.

Preferred strongly polar organic solvents are dimethyl formamide, dimethyl acetamide, N-methyl pyrrolidone or dimethyl sulphoxide, of which the first two are particularly preferred.

Suitable initiators are the known redox systems, although it is particularly preferred to use a system consisting of a peroxodisulphate and a 1,3-diketone. Alkali peroxodisulphates are used as the peroxodisulphate, ammonium peroxodisulphate being preferred. Suitable 1,3-diketones are, for example, dibenzoyl methane, benzoyl acetone and acetyl propionyl methane. The preferred 1,3-diketone is acetyl acetone. The reaction may be carried out in the presence of acids, for example inorganic mineral acids, preferably sulphuric acid.

At the beginning of the reaction, the concentration of the monomers in the solvent amounts to between about 30 and 40% by weight. The molar ratio of peroxodisulphate to 1,3-diketone may be varied within wide limits. A ratio of from 1:1.1 to 1:1.3 has proved to be particularly advantageous. The amount of acid added may be very small. It is of particular advantage to use the acid in a quantity equivalent to a molar ratio of from about 1:1.2 to 1:3.2 to the quantity of 1,3-diketone used.

It is also advantageous to add the peroxodisulphate/1,3-diketone system in portions to the reaction mixture. The reaction time is generally between 8 and 24 hours, the reaction best being carried out in an inert gas, preferably nitrogen. The reaction is with advantage carried out at an elevated temperature. Temperatures in the range from 35° C to 55° C have proved to be particularly favourable. The polymerisation reaction is exothermic, so that the reaction continues for several hours at the requisite temperature in the absence of any further supply of heat. It is known that unreacted acrylonitrile acts as a precipitant in a solution. Accordingly, clouding may occur during the polymerisation reaction, although it disappears by distilling off the unreacted monomer on completion of the polymerisation reaction. The solution is concentrated either by straightforward distillation or preferably in a thin layer evaporator at low temperatures. It was surprising to find that, when the above-mentioned catalysts were present, no clouding occurred during the polymerisation reaction providing it was carried out in the presence of an unsaturated carboxylic acid ester, preferably methyl acrylate, in a quantity of from 5 to 10% by weight and preferably in a quantity of from 6 to 9% by weight, based on the monomers used.

The yields are generally about 80 to 85% by weight, whilst the K-values of the polymers amount on average to between 70 and 90. Removal of the unreacted fractions by distillation leaves solutions which can be wet or dry spun into filaments without any evidence of crosslinking during spinning. If crosslinking is deliberately induced in the filaments, for example by the action of acids or heat, filaments distinguished by a favourable natural colour and extremely good textile properties are obtained.

Accordingly, the advantages of not using stabilising agents, for example relatively large quantities of salts, and the advantages of solution polymerisation may be utilised in these processes. The advantages of the solution polymerisation of acrylonitrile over the processes hitherto worked on a commercial scale in which the polymerisation reaction is carried out in aqueous medium are well known: there is no need to isolate, dry, size-reduce or redissolve the polymers, so that a spinning solution is directly obtained in a simple manner from a solution of monomers.

In the following Examples, which are to further illustrate the invention without limiting it, the parts by weight quoted are to parts by volume as kilograms to liters.

EXAMPLE 1

118 parts by volume of acrylonitrile and 5 parts by weight of N-methoxy methyl acrylamide were introduced into 180 parts by weight of dimethyl formamide. The polymerisation reaction was started under nitrogen at 40° C by the addition of 0.6 part by weight of ammonium persulphate and 0.4 part by volume of acetyl acetone. After an interval of 4 hours, 1.2 parts by weight of ammonium persulphate and 0.9 part by volume of acetyl acetone were additionally introduced. The viscous solution was stirred for a total of 22 hours. By stirring the solution obtained into water, the required polymer was isolated in a quantity of 79 parts by weight and dried in vacuo at 50° C to 60° C. K-Value: 72.5.

EXAMPLE 2

250 parts by weight of dimethyl formamide, 118 parts by volume of acrylonitrile and 5 parts by weight of N-methoxy methyl acrylamide were heated to 40° C. The polymerisation reaction was started by the addition of 12 parts by weight of ammonium persulphate and 0.8 part by volume of acetyl acetone, followed by stirring under nitrogen for 21 hours. The viscous solution was then freed from the residual monomers in a thin layer evaporator and diluted to such an extent that it had a viscosity of 480 p (80° C).

EXAMPLE 3

250 parts by weight of dimetyl formamide, 118 parts by volume of acrylonitrile and 5 parts by weight of N-methoxy methyl acrylamide were heated to 40° C. The polymerisation reaction was started by the addition of 12 parts by weight of ammonium persulphate and 0.8 part by volume of acetyl acetone. The polymerisation mixture was stirred under nitrogen for 21 hours, after which the viscous solution was poured into water.

Yield: 65 parts by weight, K-value: 73.

EXAMPLE 4

118 parts by volume of acrylonitrile and 5 parts by weight of N-methoxy methyl acrylamide were introduced into 280 parts by weight of dimethyl acetamide. After heating to 40° C, the polymerisation reaction was started by the addition of 1.7 parts by weight of ammonium persulphate and 1.2 parts by volume of acetyl acetone. The polymerisation mixture was then stirred under nitrogen for 22 hours. The polymer was isolated and dried in the same way as in the following Examples.

Yield: 68 parts by weight, K-value: 71.

EXAMPLE 5

118 parts by volume of acrylonitrile and 5 parts by weight of N-methoxy methyl acrylamide were added to 200 parts by weight of dimethyl acetamide. After the solution had been heated to 40° C, the polymerisation reaction was started by the addition of 1.2 parts by weight of ammonium persulphate and 0.8 part by volume of acetyl acetone. After a polymerisation time of 6 hours, the polymerisation mixture was stirred under nitrogen at room temperature for another 16 hours. The mixture was then thoroughly stirred with water, filtered under suction, washed and dried at 50° – 60° C.

Yield: 71 parts by weight, K-value: 75.

EXAMPLE 6

118 parts by volume of acrylonitrile and 5 parts by weight of N-methoxy methyl acrylonitrile methyl acrylamide were introduced into 200 parts by weight of N-methyl pyrrolidone. The polymerisation reaction was started under nitrogen at 40° C by the addition of 1.7 parts by weight of ammonium persulphate and 1.2 parts by volume of acetyl acetone. The solution was stirred under nitrogen for 22 hours. The required polymer was isolated by adding water to the viscous solution, after which it was filtered under suction, washed and dried at 60° C.

Yield: 75 parts by weight, K-value: 73.

EXAMPLE 7

200 parts by weight of N-methyl pyrrolidone, 118 parts by volume of acrylonitrile, 5 parts by weight of N-methoxy methyl acrylate were combined and heated to 40° C. The polymerisation reaction was started by the addition of 1.4 parts by weight of ammonium persulphate and 0.8 part by volume of acetyl acetone. The polymerisation mixture was stirred first for 6 hours at 40° C and then for 16 hours at room temperature. It was then thoroughly stirred with water, filtered under suction, washed and dried at 50° C.

Yield: 63 parts by weight, K-value: 75.

EXAMPLE 8

118 parts by volume of acrylonitrile and 5 parts by weight of N-methoxy methyl acrylamide were introduced into 180 parts by weight of dimethyl formamide. The polymerisation reaction was started under nitrogen at 40° C by the addition of 0.5 part by weight of ammonium persulphate, 0.4 part by volume of acetyl acetone and 0.01 part by volume of concentrated sulphuric acid. After an interval of 5 hours, another 1.1 parts by weight of ammonium persulphate were added. The viscous solution was stirred for a total of 18 hours. By stirring the solution obtained into water, the required polymer was isolated in a quantity of 83 parts by weight and dried in vacuo at 50° – 60° C. K-Value: 78.5.

EXAMPLE 9

The polyacrylonitrile solution of Example 2 was filtered and dry spun by a standard method. 70 packages of filament yarns with a total denier of 1600 dtex were combimed to form a sliver and four such slivers combined to form a tow with an overall denier of dtex 448,000. The tow was drawn in a ratio of 1:3.6 in boiling water, washed, treated with antistatic preparation, dried in the absence of tension for 10 minutes at 175° C (crosslinking taking place under the effect of the heat applied) and crimped. The fibre tow had an individual fibre denier of 3.3 dtex.

Under a melting point microscope, the fibres did not show any deformation up to a temperature of 350° C.

The fibres were completely undissolved after 1 hour in cold dimethyl formamide solution and dimethyl formamide solution which had been heated to 130° C. The following Table shows the tensile strengths (centi Newtons/dtex) and elongation at break (%) in air at different temperatures and at 20° C after a 1 minute wash at 90° C of the fibres by comparison with a dry spun acrylic fibre with a denier of 3.3 dtex produced from a copolymer of 94% by weight of acrylonitrile, 5% of methyl acrylate and 1% of methallyl sulphonate and drawn in a ratio of 1:3.6 in boiling water:

|  | Fibre according to Example 2 | Comparison |
| --- | --- | --- |
| Temperature 20° C |  |  |
| Strength | 43 | 1.52 |
| Elongation | 24 | 54 |
| Temperature 50° C |  |  |
| Strength | 1.22 | 0.53 |
| Elongation | 39 | 70 |
| Temperature 90° C |  |  |
| Strength | 0.45 | 0.19 |
| Elongation | 53 | >200 |
| Temperature 20° C after washing at 90° C |  |  |
| Strength | 1.40 | 1.48 |
| Elongation | 23 | 60 |

As can be seen from the Table, the force necessary to obtain "flow" in the fibres according to the invention is distinctly higher than in the case of the fibres of the above composition which do not conform to the invention.

Pieces of knitting produced from fibre yarns of the fibres according to the invention and, for comparison, from the comparison fibres of the above composition were washed with a gentle detergent, spin-dried and dried at room temperature 5 times at 60° C (according to DIN 54 010) and 5 times at 95° C (according to DIN 54 011). The dimensional changes were then determined.

| Fibre denier (dtex) | Yarn count (Nm) | Washing | Dimensional Length | change (%) Width |
| --- | --- | --- | --- | --- |
| 3.3 | 36/1 | 5 × 60° C | −4 | +11 |
| 3.3 | 36/1 | 5 × 95° C | −6 | +18 |
| Comparison Fibre denier (dtex) | Yarn count (Nm) | Washing | Dimensional Length | change (%) Width |
| 3.3 | 36/1 | 5 × 60° C | −14 | +40 |
| 3.3 | 36/1 | 5 × 95° C | −20 | +60 |

As can be seen from the dimensional changes, a distinct improvement in dimensional stability is obtained with the crosslinked fibres.

What is claimed is:

1. A process for the production of spinnable solutions of crosslinkable copolymers of acrylonitrile which comprises solution polymerisation of at least 48% by weight of acrylonitrile, 0.5 to 12% by weight of a copolymerisable acid amide-N-methylol alkyl ether and, optionally, other copolymerisable comonomers in a strongly polar organic solvent and in the presence of a peroxodisulphate and a 1,3-diketone as catalyst system.

* * * * *